Nov. 23, 1926.
L. F. MOODY
1,607,773
HYDRAULIC TURBINE
Original Filed Feb. 26, 1923    2 Sheets-Sheet 1
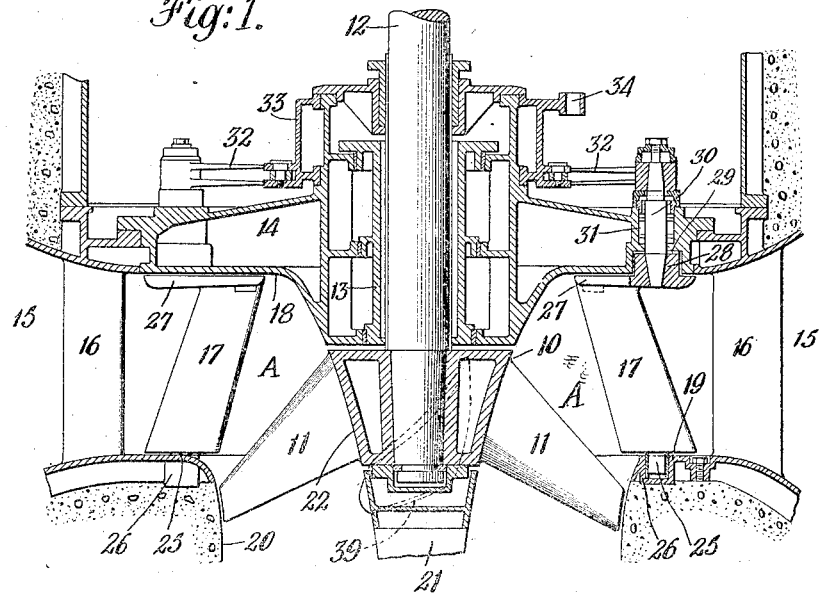
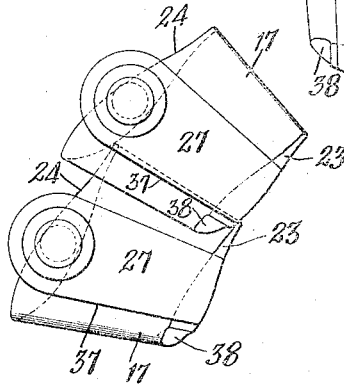
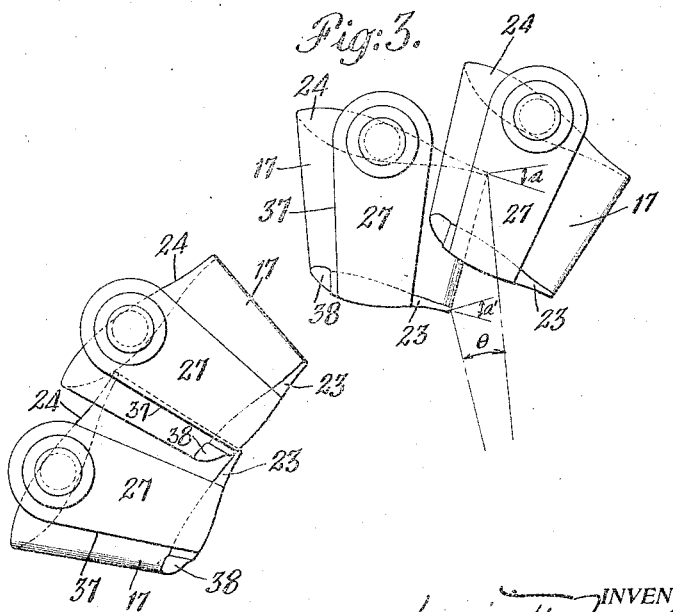
INVENTOR
Lewis F. Moody
BY
ATTORNEYS Nov. 23, 1926.
L. F. MOODY
HYDRAULIC TURBINE
Original Filed Feb. 26, 1923   2 Sheets-Sheet 2
1,607,773
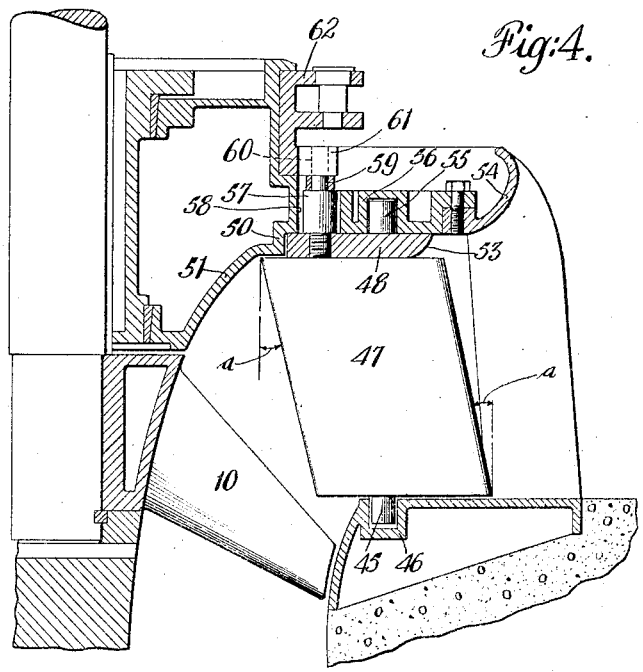
Fig:4.
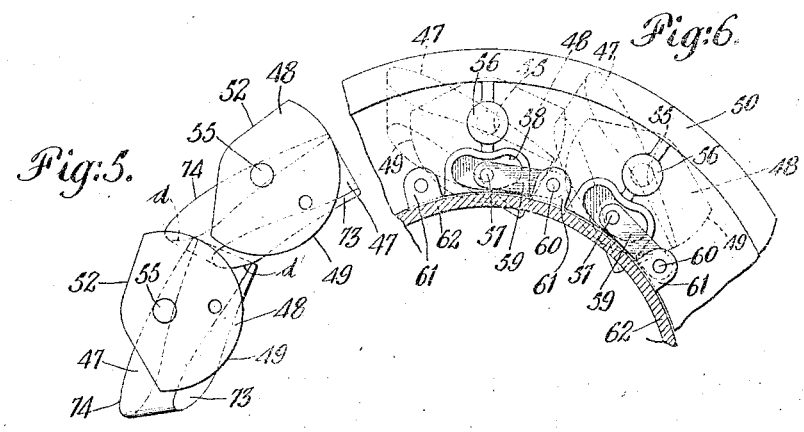
Fig:5.  Fig:6.
INVENTOR
Lewis F. Moody
BY Edwards, Sager & Bower
his ATTORNEYS Patented Nov. 23, 1926.

1,607,773

UNITED STATES PATENT OFFICE.

LEWIS FERRY MOODY, OF PHILADELPHIA, PENNSYLVANIA.

HYDRAULIC TURBINE.

Original application filed February 26, 1923, Serial No. 621,140. Divided and this application filed November 29, 1924. Serial No. 752,365.

This invention relates to hydraulic turbines of the type in which the flow is regulated by means of guide vanes rotatably adjustable about their axes. It also relates particularly to such turbines of high specific speed, especially those equipped with diagonal or axial flow runners. Very high specific speeds can be attained with good efficiency by the use of runners in which the flow through all parts of the runner is in a diagonal or approximately axial direction when considered in a plane containing the turbine axis, such runners usually being constructed of the propeller type having a relatively small number of blades unshrouded at their outer ends. When such runners are used with the usual type of wicket gates or adjustable guide vanes, the flow passing in a generally radial direction through the guide vanes must then be turned from radial to substantially axial and the elements of the stream which enter the runner nearest the axis must traverse a relatively long distance after being accelerated to a comparatively high velocity by the guide vanes, this distance being traversed in a spiral direction about the axis and the velocity being still further accelerated on the way.

One object of the present invention is to provide an improved construction whereby the length of this passage between the guide vanes and runner is shortened and in this manner frictional losses incident to the flow of the water to the runner are reduced, undue acceleration or variation of velocity in the long unguided path are avoided, more definite and determinate control of the flow is provided, and economy of material is secured in the turbine structure.

A further object of the invention is to provide an improved form and mounting of the adjustable guide vanes so that with their discharge edges inclined to the axis of the runner they can be conveniently operated and will furnish proper guidance to the flow and will enable high efficiency to be secured in a turbine under normal, overgate or part-gate conditions. The inclined inner edges of the guide vanes of this invention are positioned nearer to the entrance edges of the runner blades than would be the case if the usual wicket gates were used and they guide the flow lines in such manner as most efficiently to cooperate with the runner in all positions of the guide vanes.

Other objects and advantages will appear from the following description taken in connection with the accompanying drawings wherein—

Fig. 1 is a fragmentary vertical section partly in elevation, of a turbine embodying one form of my invention.

Fig. 2 is a plan view of two of the movable guide vanes shown in Fig. 1, the vanes being shown in Fig. 2 in closed position.

Fig. 3 is a view similar to Fig. 2 showing the guide vanes opened to approximately normal position.

Fig. 4 is a fragmentary sectional view partly in elevation of a turbine embodying a modified form of my invention.

Fig. 5 is a fragmentary plan view of a plurality of movable guide vanes one of which is shown in Fig. 4.

Fig. 6 is a plan view showing the operating means for the guide vanes shown in Figs. 4 and 5.

Referring more particularly to Fig. 1 the turbine is provided with a runner 10 of the diagonal inward flow type formed with a series of blades 11 the upper ends of the entrance edges of which are nearer to the turbine axis than the lower ends of said edges. The runner 10 is secured to a shaft 12 mounted to rotate in the bearing 13 formed in the head cover 14. Water from the intake conduit 15 passes into the turbine through stay vanes 16 thence through the guide vanes 17 in the space A between the upper casing surface 18 and lower ring 19 in which space it is turned from a direction which is substantially radial to one which is downwardly and inwardly inclined, thence between the runner blades 11 and into the draft tube 20. The draft tube as shown is formed with a central core 21 whose outer surface is continuous with the surface 22 of the runner hub.

In the space A the movable guide vanes or wicket gates 17 are adjustable to control the flow. These vanes are of the form shown in Figs. 2 and 3 wherein 23 indicates the upper end surface of the vane and 24 the lower end surface. Between these surfaces the vane is formed of straight line elements which are inclined to the planes of these surfaces as shown. The vanes 17 are mounted so as to have a general upward and inward inclination as may be seen in Fig. 1. The lower end of the vane is formed with a trunnion 25 adapted to be seated in a bearing 26 formed in the ring 19. The upper end of the vane is secured to the outer end of an arm 27 which arm is formed with a boss or hub 28 adapted to be seated and rotate in an opening 29 formed in the head cover. This hub is rigidly secured to the lower end of a vertical stem 30 which is adapted to rotate in a bearing 31 formed in the head cover. The stem 30 has secured to its upper end an arm 32 which is adapted to be actuated from the operating ring 33 by means of a link 34. The axes of the stem 30 and trunnion 25 are in a line parallel to the turbine axis.

It will be noted that by the use of the arm 27 the vane may be pivoted so that its axis of rotation lies outside of the body of the vane at its upper portion and thus may be made to extend a considerable distance at its upper portion from its own axis in the direction of the runner.

The use of the usual wicket gates with axial or diagonal high speed runners is sometimes attended with disturbed flow conditions adjacent the runner hub due to the fact that the elements of the flow which enter the runner close to the hub are required to flow through a wide radial space without guidance after they leave the guide vanes. In such a free space, the elements of the flow will have a constant moment of momentum about the turbine axis, since except for the friction of the guiding walls no tangential force is applied to the stream from the time it leaves the guide vanes until it enters the runner. It therefore results that the mass of any stream element multiplied by its velocity and by its radial distance from the axis remains constant throughout this space and therefore its velocity will increase as its radius decreases, the velocity and radius being inversely proportional. The comparatively great decrease in radius experienced by the innermost stream elements as they pass from the guide vanes to the runner therefore produces a very considerable increase in velocity, and as the guide vanes are closed into part-gate position and the velocity of flow through the guide vanes increases and the distance of the discharge edge of the guide vanes from the axis increases it is seen that the absolute velocity with which the water enters the runner will still further increase, frequently to an undesirable extent, under part-gate conditions of operation. The whirl component of velocity about the turbine axis of the water entering a high speed runner is therefore frequently large at normal gate and at part-gate becomes great enough to result in losses since under these part-gate conditions the angle of the entrance edges of the runner blade will be different from the relative direction of entrance of the runner. By the use of the inclined guide vanes of this invention, it becomes possible to reduce the variation of velocity at entrance to the runner and to insure that this velocity will not reach excessive values at part-gate.

An objectionable effect of the above conditions in a turbine with the usual wicket gates is the tendency at part-gate for the flow to form a surface of discontinuity separated from the runner hub and the inner boundary of the transition space between the guide vanes and runner; leaving a region of water which does not partake of the general flow and in fact may have a reverse direction through the runner and may contain local eddies and turbulence. By the use of the inclined guide vanes here described the water is given positive guidance at a point nearer to the turbine axis and the tendency of the flow to leave the inner boundary surfaces of the transition and runner space is reduced or avoided. At the same time the advantages of the rotary adjustment of the guide vanes are retained, the guide vanes and regulating mechanism being subject to small hydraulic load and having small inertia and thus being adapted for quick regulation.

One method of designing the guide vanes by which they may be laid out in a simple manner is as follows:

The horizontal sections of the guide vane taken at different distances from one end of the vane may be made geometrically similar to each other but increasing in size in proportion to the distance of each section from the turbine axis. The straight line elements of the vanes 17 are so arranged that when the vanes are in closed position as shown in Fig. 2 these elements if continued will all intersect the turbine axis at a single point. This enables the vane to be very simply designed and also provides that all the vanes shall come together along straight line elements and so effectively shut off the supply of water to the runner. When made desirable by the hydraulic conditions, the guide vane may be composed of curved elements transverse to the flow instead of straight elements as shown in the figures. The use of straight elements is the preferred construction on account of the simple form of surface and suitability for machining the vane edges or surfaces. The arm 27 is tapered or rounded at its entrance edge 37 in order to give a smooth contour for the water flow. To avoid interference between the top of one vane and the arm of an adjacent vane when the vanes are moved to full open position the top of each vane is formed with a notch 38 so that the arm may move a certain distance over an adjacent vane. Instead of cutting away a portion of the vane 17 a notch may be formed in the arm 27. The stay vanes 16 will in the usual design be inclined to the radial so as to conform to any whirl of the incoming flow such as would be acquired by passage through a volute intake conduit.

Referring to Figs. 2 and 3 it will be noted that as the guide vanes 17 are rotated from their closed position (in a clockwise direction) every part of the guide vane will of course rotate through the same angle, the lower portion 24 of the guide vane will rotate without moving laterally, and in its open position the discharge tips of the vanes will be inclined in a direction making an angle α with the tangential direction as indicated in Fig. 3. The upper ends 23 of the guide vanes however will not only rotate but will change position due to their rotation being about the axis offset at some distance from the vane section. The vane tip will therefore be inclined in a direction forming an angle α' with respect to a tangent drawn at the new position of the tips and this angle will exceed the angle α by the amount θ, the angle between radii drawn to the two positions of the vane tips. This means that on account of the upper section of the vane of the form shown opening nearer the turbine axis it will open to a greater angle of admission than the lower end of the vane thus directing the water with a smaller whirl component at the top of the guide vane than at the bottom. This reduced whirl component will give favorable conditions of design for the runner since the water coming from the top of the guide vane enters the runner at a point nearer to the axis of the runner where the linear velocity of the runner vanes is reduced as compared with the vane tips which encounter the water flowing from the lower end of the guide vanes. By the use of guide vanes of inclined form therefore it becomes possible to design the runner with a less extreme variation of entrance angle of the runner vanes from the tips to the hub and to avoid any tendency toward the hooked form of runner vane near the hub. The outline of one of the runner vanes is shown in dotted lines at 39 in Fig. 1.

Besides introducing water at a greater angle and correspondingly smaller whirl component at the top of the vanes than the angle α at the bottom the difference in radius between the outflow tips of the guide vanes and the inflow tips of the runner vanes for the upper portion of the flow is reduced and therefore its increase in whirl due to the decrease in radius as the water passes through the transition space A is reduced in amount and therefore by introducing the water at a point nearer the axis as is provided by this form of guide vane in which the guide vane orifice occurs nearer the axis at the top the conditions of flow will be improved not only at normal and full gate but also at part gate and this form of guide vane will be of material value in improving the part gate performance of the turbine, that is, its operation under small loads. While the guide vanes are located near the entrance edges of runner blades the transition space is sufficient to permit the stream to form itself in a solid whirling mass which is directed to the runner in an efficient manner. The guide vanes may be designed and placed so that there are practically no crossings of the stream lines and the formation of eddies and cross currents is avoided.

In Figs. 4 to 6 I have shown a modified form of vane and operating means and also a somewhat modified form of speed ring, this modification being shown in an open flume setting. The vane 47 here shown is formed with a lower trunnion 45 mounted in the lower distributor ring 46 as in the previous figures. Secured to the top of the vane however is a disc 48 formed with a circular side 49 adapted to be seated within the curved wall 50 of the recessed portion of the head cover 51. The disc 48 is cut away along its edge 52 so as to permit its removal through the speed ring crown 54. The lower face of the disc is curved upwardly along its forward edge 53 to provide a smooth contour for the water flow. A trunnion 55 secured to the upper face of the disc 48 is adapted to rotate in a bearing 56 in the head cover. Secured in the disc is an operating pin 57 adapted to extend upwardly through a slot 59 formed in the head cover. This pin 57 is connected by means of a link 59 and pin 60 to a projection 61 extending outwardly from the operating ring 62. The disc 48 serves to maintain the slot 58 closed against the flow of water therethrough.

The upper end 73 of the vane 47 is not exactly similar to the lower end 74 of said vane but is somewhat smaller and differently shaped and directed at a different angle so that, as in Fig. 3, in open position of the vane the angle α' at the top of the vane is greater than the angle α at the bottom so that the lower portions of the vane will make a smaller angle with the tangential direction than the upper section does. Between the upper and lower sections the vane surfaces extend with straight line elements and in closed position successive vanes will contact (Fig. 5) along a line which at the bottom is nearer the entrance edge of the vane than at the top. That is the distance $d$ (Fig. 5) is smaller than the distance $d'$.

By the use of the inclined guide vanes as shown in Figs. 1 to 6 it is possible to incline the stay vanes somewhat as indicated in Fig. 4 and so form the upper speed ring crown 54 of less diameter than would be the case if the usual vertical stay vanes were employed. This constitutes not only a saving of material but lessens the effective length of the narrow entrance passage and so lessens the distance that must be traversed by the water at high speed.

The turbine of this invention receives the entering flow through the stay vanes in a radial or nearly radial direction and, while turning it toward the axial direction, controls it by the adjustment of the inclined guide vane surfaces along which the flow passes with combined axial and radial components. Beyond these inclined guide vanes the flow continues to turn toward the axial direction so that at the entrance to the runner it is largely, or it may be wholly, axial in direction. A whirl is imparted to the entering flow either by the intake casing or the stay vanes or both and this whirl is continued and variably increased by the pivoted inclined guide vanes so that the water is directed against the runner in a solid whirling mass rotating at high velocity. The high-speed propeller type runner is placed at or near the narrowest portion of this vortex-like flow and is carried around by it at a high rotational speed and with relatively low torque so that the discharge from the runner still continues to whirl with considerable velocity. To convert the tangential or whirling components of the velocity of the discharge into useful pressure head the draft tube is preferably of the annular form indicated in the drawings. The propeller type of runner will have only a few blades usually six or less and preferably will be unshrouded.

In the turbine shown in Figs. 1, 2 and 3 the diagonal type of runner 11 has its entrance edges clearing the trailing edges of the guide vanes 17 in all positions so that no matter how these guide vanes swing around their vertical axes they cannot come in contact with the runner edges. If therefore these guide vanes become disconnected from the operating mechanism so as to turn freely in the flow their closest approach to the runner edges will still leave a clearance space so as to avoid any damage to the turbine.

The interposition of the adjustable guiding surfaces in the form of inclined guide vanes in the flow intermediate between radial and axial not only shortens the length of the high velocity flow between the guide vanes and runner but also permits the whole turbine structure to be made more compact with reduced distance between the stay vane entrance and the runner. The velocity of the flow is thus quickly speeded up and controlled while being simultaneously accelerated and turned from radial toward axial and all of the space is most efficiently utilized. The high speed propeller type of runner with a high velocity whirl of the entering flow makes is particularly important to reduce the areas in contact with this high velocity flow in order to reduce the frictional losses. The turbine of this invention therefore effects a saving not only in size and first cost of the turbine but also increases the power output by increasing the efficiency of the turbine in operation.

This application is a division of my copending application Serial No. 621,140, filed February 26, 1923.

I claim:

1. In a turbine the combination with a stay vane ring, of a stationary head cover having an outer radially directed surface for guiding the flow radially and an inner surface formed as a continuation of said outer surface and curving toward the axial direction to turn the flow axially to the turbine runner a turbine runner receiving said flow and guide vanes mounted eccentrically on their axes and moving at their upper ends along said radially directed portion of said head cover and extending close to said inner surface of said head cover.

2. In a turbine the combination with a stay vane ring, of a stationary head cover supported thereby and having an outer radially directed surface for guiding the flow radially and an inner surface formed as a continuation of said outer surface and curving toward the axial direction to turn the flow axially to the turbine runner, a turbine runner receiving said flow and guide vanes mounted eccentrically on their axes and moving at their upper ends along said radially directed portion of said head cover and extending close to said inner surface of said head cover.

3. In a hydraulic turbine the combination with a stay vane ring through which the meridian components of the inflow to the turbine runner are substantially radial in direction, a turbine runner discharging the flow in a substantially axial direction and guiding means between said stay vanes and said runner adapted to guide the flow while turning from radial toward the axial, comprising pivoted guide vanes through which the flow passes with combined radial and axial components, said pivoted guide vanes having substantially straight discharge edges inclined to the runner axis and turning about axes parallel to said runner axis.

4. In a hydraulic machine having a runner and a passage communicating there-with, a guide vane in said passage pivoted about an axis parallel to the axis of said runner, said guide vane being inclined from its axis toward the runner at the one end, the said axis lying outside said vane for at least a portion of the length of said vane.

5. In a hydraulic machine having a runner and a curved inlet passage leading thereto, a guide vane in said passage pivoted about an axis parallel to the axis of said runner, said guide vane being inclined from its axis toward the runner at the one end, the said axis lying outside said vane for at least a portion of the length of said vane.

6. In a hydraulic machine having a runner and an inlet passage which curves from a radial to a substantially axial direction at the runner, a guide vane in said passage pivoted about an axis parallel to the axis of said runner, said guide vane being inclined from its axis toward the runner at the one end, the said axis lying outside said vane for at least a portion of the length of said vane.

7. In a hydraulic machine having a diagonal flow runner and a curved inlet passage leading thereto, a guide vane pivoted about an axis parallel to the axis of said runner, said guide vane being inclined from its axis toward the direction of the entrance edges of the runner blades, said vane axis lying outside of certain sections of said vane taken in planes at right angles to said axis.

8. In a turbine, supporting means and a guide vane pivotally secured thereto, one end of said vane lying to one side of the axis about which said vane is pivoted and being connected to rotate about said axis by a member pivoted to rotate about said axis and extending laterally thereof to said vane.

9. In a hydraulic machine a runner, means forming a curved passage leading thereto, a guide vane in said passage, a trunnion formed at one end of said vane and seated in the wall of said passage, a shaft mounted in opposite wall of said passage in alignment with said trunnion, and a member extending laterally with respect to said axis and connected at one end to said shaft and at the other end to said vane.

10. In a turbine, a runner, means forming a curved passage leading thereto, a guide vane in said passage, and means for pivotally supporting said guide vane comprising a shaft mounted in one wall of said passage and a member extending laterally of said shaft and connected at one end to said shaft and at the other end to said vane.

11. In a turbine, a runner, means forming a curved passage leading thereto, a guide vane in said passage, and means for pivotally supporting said guide vane comprising a shaft mounted in one wall of said passage and a member extending laterally of said shaft and connected at one end to said shaft and at the other end to said vane, said member being located in said passage and formed with a curved surface to provide for a smooth flow around said member.

12. In a turbine, a runner, means forming a curved passage leading thereto, the wall of said passage being formed with a recessed portion, a guide vane in said passage, and means for pivotally supporting said guide vane comprising a shaft mounted in the wall of said passage, and a member secured at one end to said shaft and at a point laterally of said shaft to said vane, said member being located in said recessed portion.

13. In a turbine, a runner having blades extending outwardly from its axis, means forming an inlet passage which directs the flow along a path curving from radial toward axial, a series of inwardly inclined guide vanes located in said passage and pivoted about axes which are parallel to the runner axis, the sections of said vanes along planes transverse to the runner axis being similar in form but varying in size in accordance with the distances of the section from the runner axis.

14. In a turbine the combination with a high speed propeller type runner having blades with entrance edges receiving the flow with an axial component, of guiding means for the inflow to said runner comprising a radial flow portion, a transition space and pivoted guide vanes having diagonally inclined surfaces in said transition space and across the entrance flow to said runner and axes parallel to the axis of said runner.

15. In a turbine the combination with a high speed propeller type runner having blades with entrance edges receiving the flow with an axial component, of guiding means for the inflow to said runner adapted to direct the flow diagonally between the radial and the axial direction comprising a radial flow portion, a transition space and guide vanes having diagonally inclined surfaces in said transition space and across the entrance flow to said runner and axes parallel to the axis of said runner.

16. In a hydraulic turbine the combination with a stay vane ring through which the meridian components of the inflow to the turbine runner are substantially radial in direction, a turbine runner discharging the flow with the meridian component in a substantially axial direction and guiding means between said stay vanes and said runner adapted to guide the flow while turning from radial toward the axial, comprising pivoted guide vanes through which the flow passes with combined radial and axial components, said pivoted guide vanes having discharge edges inclined to the runner axis and turning about axes parallel to the runner axis.

17. In a turbine a runner having blades extending outwardly from its axis, means forming an inlet passage which directs the flow along a path curving from radial toward axial, a series of inwardly inclined guide vanes located in said passage and pivoted about axes parallel to the runner axis, said vanes having sections in planes transverse to their axes which vary in shape at various axial distances from the bottom of said vanes.

LEWIS FERRY MOODY.